Figure 1:
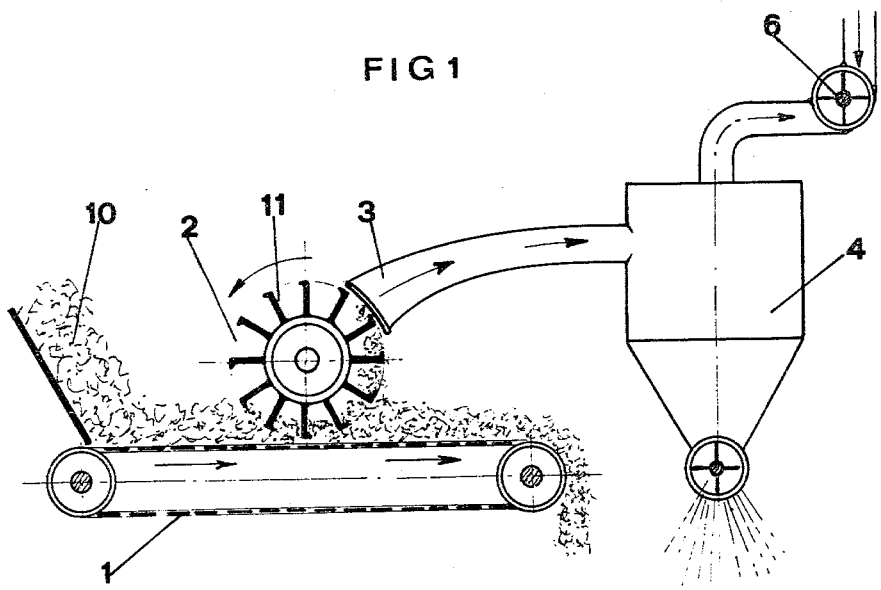

United States Patent [19]

Cerroni

[11] 4,207,986
[45] Jun. 17, 1980

[54] APPARATUS FOR SEPARATING PLASTIC FILM FROM PAPER PARTICULARLY ADAPTED FOR USE IN WASTE RECYCLING SYSTEMS

[76] Inventor: Manlio Cerroni, Via Bruxelles 53, Rome, Italy

[21] Appl. No.: 911,411

[22] Filed: Jun. 1, 1978

[30] Foreign Application Priority Data

Jun. 3, 1977 [IT] Italy ............................ 49707 A/77
May 16, 1978 [IT] Italy ............................ 49389 A/78

[51] Int. Cl.² ............................................ B07C 5/36
[52] U.S. Cl. .................................. 209/616; 209/930; 209/688; 209/925
[58] Field of Search .............. 209/616, 615, 930, 607, 209/688, 925

[56] References Cited

U.S. PATENT DOCUMENTS

| 972,294 | 10/1910 | Tompkins | 209/616 |
| 1,694,817 | 12/1928 | Gudmundsen et al. | 209/688 |
| 2,861,685 | 11/1958 | Cordis | 209/616 |
| 3,696,925 | 10/1972 | Harper | 209/688 |

FOREIGN PATENT DOCUMENTS 551193 11/1956 Italy ........................................ 209/615

Primary Examiner—Allen N. Knowles
Attorney, Agent, or Firm—Toren, McGeady and Stanger

[57] ABSTRACT

Apparatus for separating composite waste materials composed chiefly of plastic film and paper including a conveyer for moving the composite material along a substantially horizontal path in a given direction and a reel device having a plurality of hooked members extending therefrom rotating to move the hooked members through the composite material at a portion of the horizontal path, with the hooked members moving in the same direction in which the composite material is moving while being passed therethrough. The hooked members of the reel device engage plastic film contained in the composite material to separate the plastic film therefrom. The reel device may be formed by a plurality of generally linear belt type conveyors each extending at an oblique angle to the horizontal direction of travel of the composite material and each having an end overlapping an adjacent reel device so that engaged plastic material may be serially deposited between reel devices in an upstream direction taken relative to the direction of travel of the composite material until it is removed from or released by the reel device which is furthest upstream.

7 Claims, 4 Drawing Figures

APPARATUS FOR SEPARATING PLASTIC FILM FROM PAPER PARTICULARLY ADAPTED FOR USE IN WASTE RECYCLING SYSTEMS

The increasingly generalized use of plastic material, which now is employed in packaging for food, clothing and in many other fields involving different types of utilization, renders necessary the provision of waste treatment plants which, during processing of urban solid waste, will enable effective separation of plastic from other portion of the waste, particularly from the bulk of paper normally intermingled with such plastic material. The ability to facilitate such separation will, of course, facilitate the recycling and recovery of various components of the waste material.

An object of the present invention is to provide a plant for separating plastic in film form from paper. The apparatus of the invention generally comprises a conveying belt, one or more reels having an elongated shape, similar to a conveying belt, and rotating in the same feeding direction of the belt, with a conveyor belt intended for the recovery of plastic in film form being also provided.

Figure 2:
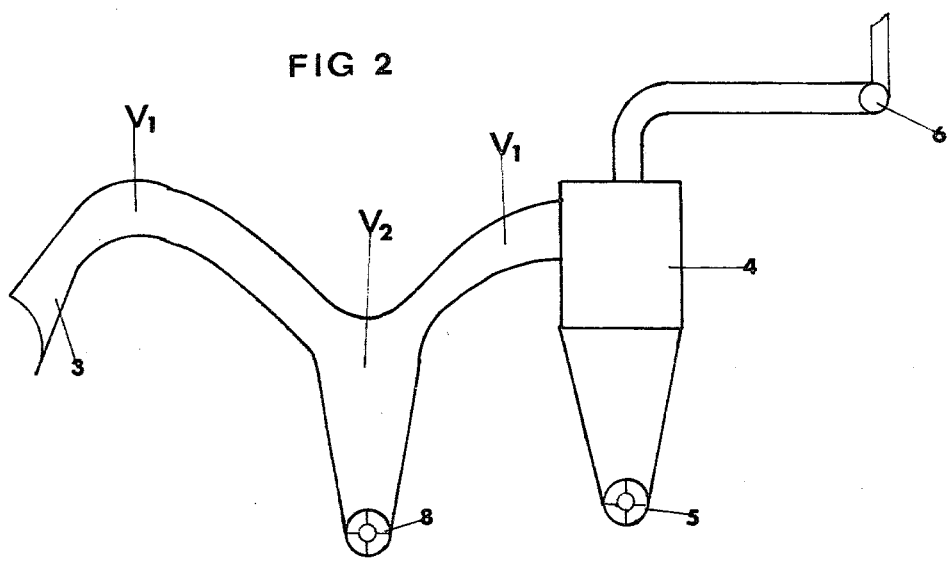
Figure 3:
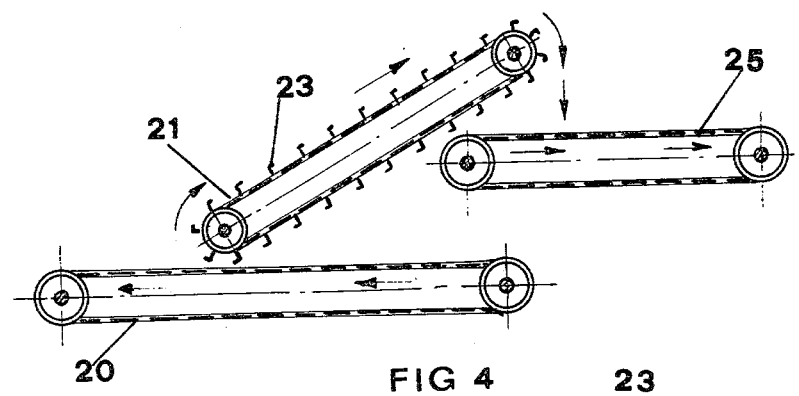
Figure 4:
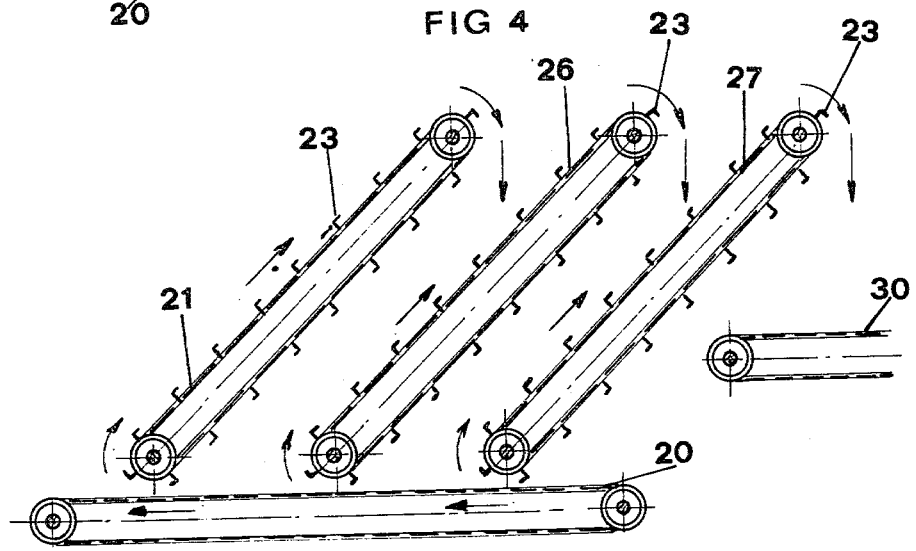

The invention itself will be better understood from the following description taken with reference to the accompanying drawings, in which:

FIG. 1 schematically shows the plant of the invention in one of its embodiments;

FIG. 2 represents a portion of the plant illustrated in FIG. 1, but according to a modification of the plant itself; and FIGS. 3 and 4 represent the plant in preferred embodiments.

With reference to the above described Figures, and particularly to FIG. 1, the plant of the invention is shown as including a conveyor belt 1, one or more reels 2, an intake mouth 3 which leads to a cyclone 4, and a fan 6, a star valve 5 being provided at the base of the cyclone.

FIG. 1 shows the the apparatus in schematic form, but the characteristic part of the invention and the underlying concept is that the belt 1 must convey the material in such a way that its direction of movement is in the same direction as the movement of the reel 2. That is, as the reel 2 and the conveyer 1 move adjacent each other; they must be moving in the same direction.

If the conveyer belt 1 is operated to convey composite waste material 10 composed chiefly of paper and plastic material, the reel 2 in its rotation will engage within the bulk of the material and will tend to engage the plastic which is being conveyed upon the belt itself.

It is to be observed that the feeding speed of the belt 1 and rotational speed of the reel 2 must be such that the reel will rotate at a suitable rim speed which will conveniently exceed the feeding speed of the belt 1. Reel 2 or, preferably, a set of reels 2, coming into contact with the material which is being conveyed on the belt 1, will tend to become entangled therein, and, by means of its spokes 11, will raise the entangled material, bringing it to pass in front of an intake mouth 3. The intake flow caused by the fan 6 will remove the material raised by the arm 11 of the reel and will cause the material itself to be drawn into a decanting or settling cyclone 4, wherein the conveyed material, that is the plastic, will settle on the bottom and will be discharged by means of the star valve 5, whereas the air will be transferred to a strainer and will be discharged or recycled.

As shown on the drawing, the spokes 11 of the reel 2 may be suitably folded, bent or hooked. They may also be composed of straight elements. The selection which is effected for the reel is based upon the different stiffness of the various material with which the reel may come into contact, so that, while plastic will wind on the spokes 11 and will be raised by them up to the intake mouth 3, paper will tend to remain on the conveyor belt 1 and will be discharged toward the further treatment or processing.

During operation of the invention, it has been noticed, however, that the same end results could be obtained by the elimination of the intake mouth 3, the cyclone 4 and the fans 6, and by modification of the reel (or series of reels) 11.

According to the further embodiment which is illustrated in FIGS. 3 and 4, the bulk of paper material is conveyed upon the conveyor belt 20 toward a reel 21, the reel 21 having an elongated shape similar to that of a conveyor belt and being provided with a large number of rods 23 which are bent at their free ends in a direction toward the feeding direction of the member carrying the rods themselves, the reel (or conveyor belt) 23 being arranged in a preferably skewed or oblique position with respect to the conveyor belt 20.

The reel 21 rotates at a speed exceeding that of the conveyor belt and, owing to the different stiffness of the paper material relative to that of plastic, the plastic will be "hooked" by the reel 21 and, successively, due to the slant of the reel itself, will be discharged upon the conveying belt 25, while the material which continues its displacement on the conveyor belt 20 will be predominantly composed of paper which can be forwarded for further processing.

FIG. 4 shows a further improvement of the invention wherein the reel 21 is augmented by a plurality of additional reels, two additional exemplary reels 26 and 27 being shown. The reels are arranged at a suitable distance from each other, so that improved separation of materials is obtained. Each of the reels may have a different and "hook" density, i.e. a different number of hooks per unit length, so that a first reel may effect a roughing function, while a second reel performs a normal function, with a third reel performing a finishing action. In order to simplify the machine, the three (or more) reels discharge the material upon each other, concentrating upon the first reel the whole amount of plastic. The first reel 27 discharges the amount of plastic thereon and the amount of plastic which it has received from the other reels upon the conveyor belt 30, this action occurring due to the slanted or oblique orientation of reels 21, 26, 27 which is provided.

It is apparent that the concepts upon which the plant is based are the same as those of the previous one, that is, the different velocities of the conveyor belt and the reel, or the reels; the fact that both members have the identical direction of rotation, the different stiffness values of the maerials which are to be separated, and the slant of the mentioned reels in respect to the conveyor belt.

From the preceding description it may be noted that, in this preferred embodiment, all those elements or parts have been removed which may require a more careful and steady maintenance and a more careful control, so that not only a reduction of the manufacturing costs is achieved but also a reduction of the operating costs.

While specific embodiments of the invention have been shown and described in detail to illustrate the application of the inventive principles, it will be understood that the invention may be embodied otherwise without departing from such principles.

What is claimed is:

1. Apparatus for separating composite waste materials chiefly composed of plastic film and paper comprising means for conveying said composite material in a substantially horizontal path along a given direction, and reel means having a plurality of radial members extending therefrom, said reel means operating to move said radial members through said composite material at a portion of said horizontal path, said radial members moving in the same direction in which said composite material is moving while being passed therethrough to thereby engage plastic film contained in said composite material and to separate said plastic film therefrom, said reel means comprising a plurality of individual reel members each having a plurality of radial members extending therefrom and each moving their respective radial members through an endless path, each of said reel members being arranged to pass said respective radial members through said composite material at different points along said horizontal path spaced apart in the direction of movement of said composite material, said reel members being arranged in a mutually overlapping arrangement such that the radial members of each reel member, other than the reel member located furthermost upstream taken in the direction of movement of said composite material, deposit plastic film engaged thereon on a next adjacent upstream reel member after passage through said composite material.

2. The apparatus according to claim 1 wherein said radial members are formed with a hooked configuration said hooked configuration extending forwardly of the direction of movement of said radial members.

3. Apparatus according to claim 1 wherein said radial members are moved through said composite material at a speed exceeding the speed of movement of said composite material.

4. Apparatus according to claim 1 wherein said reel members are arranged as endless conveyor belts each extending generally parallel to each other and obliquely relative to said horizontal path of said composite material.

5. Apparatus according to claim 4 wherein said conveyor belts each comprise a lower portion located adjacent said conveying means of said composite material and an upper portion, with the upper portion of each conveyor belt being located upstream of the lower portion of the next adjacent upstream conveyor belt, taken in the direction of movement of said composite waste material.

6. Apparatus according to claim 1 further comprising suction means located adjacent said radial members to draw off plastic film engaged thereon which has been removed from said composite material, cylone means receiving said drawn off film and star valve means for further processing said material received in said cyclone means.

7. Apparatus according to claim 6 including means defining an air flow path between said suction means and said cyclone, said air flow path including a region of relatively low air velocity wherein heavier particles entrained in said air flow path may drop therefrom by force of gravity.

* * * * *